(12) United States Patent
Gossling (10) Patent No.: US 11,462,941 B2
(45) Date of Patent: Oct. 4, 2022

(54) ENCLOSURE FOR CHARGING AN ITEM OF SMART CLOTHING

(71) Applicant: 270 VISION LTD, Hedge End (GB)

(72) Inventor: Martin Gossling, Chibolton (GB)

(73) Assignee: 270 VISION LTD, Hedge End (GB)

( * ) Notice: Subject to any disclaimer, the term of this patent is extended or adjusted under 35 U.S.C. 154(b) by 0 days.

(21) Appl. No.: 17/042,311

(22) PCT Filed: Mar. 28, 2019

(86) PCT No.: PCT/GB2019/050899
§ 371 (c)(1),
(2) Date: Sep. 28, 2020

(87) PCT Pub. No.: WO2019/186177
PCT Pub. Date: Oct. 3, 2019

(65) Prior Publication Data
US 2021/0021154 A1      Jan. 21, 2021

(30) Foreign Application Priority Data

Mar. 29, 2018 (GB) .................................. 1805185
Apr. 30, 2018 (GB) .................................. 1807047

(51) Int. Cl.
*H01M 10/44* (2006.01)
*H01M 10/46* (2006.01)
(Continued)

(52) U.S. Cl.
CPC .............. *H02J 50/10* (2016.02); *A41D 1/005* (2013.01); *H02J 7/0044* (2013.01);
(Continued)

(58) Field of Classification Search
CPC ...... H02J 7/0045; H02J 7/0042; H02J 7/0044; H02J 50/10; H02J 50/005; H02J 50/70; H02J 50/80; A41D 1/005
(Continued)

(56) References Cited

U.S. PATENT DOCUMENTS 10,418,828 B2 *   9/2019   Schadow ................ A61F 9/029
2004/0251871 A1  12/2004   Dvorak et al.
(Continued)

FOREIGN PATENT DOCUMENTS

| DE | 102014217965 | 3/2016 |
|----|--------------|--------|
| EP | 3065257      | 9/2016 |
| WO | 2017/099771  | 6/2017 |

OTHER PUBLICATIONS

Search Report & Written Opinion for Int'l Appl. No. PCT/GB2019/050899, dated May 14, 2019.
Search Report dated Sep. 26, 2018 for priority GB1805185.4.

*Primary Examiner* — Edward Tso
(74) *Attorney, Agent, or Firm* — Barnes & Thornburg LLP (57) ABSTRACT

An enclosure for charging an item of smart clothing comprising a plurality of battery-powered sensors is disclosed herein. The enclosure comprises a cavity for receiving the item of smart clothing, a charging interface configured to deliver an electromagnetic field into the cavity to charge the plurality of battery-powered sensors, a wireless communications interface for transmitting and receiving data to and from the plurality of sensors, and a processor configured to control operation of the charging interface and the communications interface.

19 Claims, 6 Drawing Sheets

(51) Int. Cl.
*H02J 50/10* (2016.01)
*H02J 50/80* (2016.01)
*H02J 50/70* (2016.01)
*A41D 1/00* (2018.01)
*H02J 7/00* (2006.01)

(52) U.S. Cl.
CPC ............ *H02J 7/0045* (2013.01); *H02J 50/70* (2016.02); *H02J 50/80* (2016.02)

(58) Field of Classification Search
USPC .............. 320/107, 108, 114, 115, 132, 148
See application file for complete search history.

(56) References Cited

U.S. PATENT DOCUMENTS

| | | | |
|---|---|---|---|
| 2014/0327320 A1* | 11/2014 | Muhs | A43B 7/02 307/104 |
| 2017/0000277 A1 | 1/2017 | Johnson et al. | |
| 2017/0214267 A1 | 7/2017 | Mak | |
| 2017/0244262 A1 | 8/2017 | Schadow et al. | |

\* cited by examiner

ENCLOSURE FOR CHARGING AN ITEM OF SMART CLOTHING

This application is a U.S. nationalization under 35 USC § 371 of PCT Application No. PCT/GB2019/050899, filed on Mar. 28, 2019, which claims priority from United Kingdom Application No. GB 1805185.4, filed on Mar. 29, 2018 and United Kingdom Application No. GB 1807047.4, filed Apr. 30, 2018, the entirety of which are each hereby fully incorporated by reference herein.

FIELD OF THE INVENTION

The present disclosure relates to an enclosure for charging an item of smart clothing.

BACKGROUND

The "internet of things" is an increasing trend, and there is a desire for items of "smart clothing" that incorporate battery-powered sensors. Items of "smart clothing" may allow various parameters of the user wearing the item of smart clothing to be measured and monitored by use of the incorporated sensors. In some cases, the sensors may be permanently fixed to the item of smart clothing. If this is the case then the sensors must be rugged enough for them to be in place whilst the garment is washed and dried, which means the enclosure they are in has to prevent both mechanical damage and to be waterproof, which negates the use of connectors. In addition, there may be multiple sensors incorporated into the item of clothing, making separate charging of each one inconvenient. Wiring them all up together is also sometimes impractical. There is therefore a need to charge battery-powered sensors in an item of smart clothing that avoids the use of physical connectors.

SUMMARY OF THE INVENTION

Aspects of the invention are as set out in the independent claims and optional features are set out in the dependent claims. Aspects of the invention may be provided in conjunction with each other and features of one aspect may be applied to other aspects.

In an aspect of the disclosure there is described an enclosure for charging an item of smart clothing comprising a plurality of battery-powered sensors, the enclosure comprising:
 a cavity for receiving the item of smart clothing;
 a charging interface configured to deliver an electromagnetic field, such as an RF field, into the cavity to charge the plurality of battery-powered sensors;
 a wireless communications interface for transmitting and receiving data to and from the plurality of sensors; and
 a processor configured to control operation of the charging interface and the communications interface.

Although the sensors are described as battery-powered sensors, it will be understood that in some examples the sensors may not comprise batteries but may instead be powered by some other form of electrical energy storage, for example a capacitive form of energy storage. It will also be understood that the term battery may encompass a single electrochemical cell and/or a plurality of cells.

It will also be understood that the delivery of electromagnetic energy into the cavity to charge the plurality of battery-powered sensors may comprise a charging current being created and/or induced in the plurality of battery-powered sensors such that a charging current is created in the sensors.

In some examples the enclosure may be a portable structure and may comprise a plurality of charging interfaces. For example, the enclosure may comprise a plurality of charging interfaces distributed at a selected interval along a boundary of the enclosure. The number of charging interfaces may be based on the size of the enclosure and/or cavity. The power output of the charging interfaces and/or the power supplied to each charging interface for charging the plurality of battery-powered sensors may also be based on the size of the enclosure and/or the spacing of the charging interfaces at intervals in the enclosure. For example, the power output of (and/or the power supplied to) each of the charging interfaces may be decreased if the number of charging interfaces serving that enclosure are increased, and/or the power output of (and/or the power supplied to) each of the charging interfaces may be decreased if the interval between respective charging interfaces serving that enclosure is decreased.

The processor may be configured to determine if the sensors are being charged by the charging interface, and in response to the processor determining that the sensors are being charged, the processor is configured to control at least one of the sensors and the wireless communications interface to download data from the sensors.

The processor may be configured to determine if the sensors are being charged by determining a change in impedance and/or current being delivered through the charging interface. Additionally or alternatively, the enclosure may comprise an electromagnetic field sensor that detects the level of electromagnetic field inside the cavity, and based on this measurement the processor of the enclosure may be configured to determine if any sensors are being charged by the enclosure.

Additionally or alternatively, each sensor may comprise a battery charge integrated circuit that controls the charge profile required for the selected battery technology. Each sensor may be configured to detect the charge current via the battery charge integrated circuit, and send a charge signal via the wireless communications interface indicating that the sensor is being charged to the processor of the enclosure. Each sensor may be configured to send the charge signal in response to the sensor reaching a selected threshold level of charge. The charge signal may comprise a unique identifier corresponding to that sensor. In response to receiving the charge signal and the unique identifier, the processor of the enclosure references the unique identifier to a database, for example in a local cache or on a remote database, for example in the cloud, to obtain the identity of the sensor and optionally its associated garment. Sibling sensor identities (for example, other sensors incorporated into the same item of smart clothing) may also be obtained in a similar manner. By referencing the unique identifier to a database in this way, the sensors may be paired to a user's account. Data from the sensors may then be downloaded, for example to the user's account, and the local clock on each sensor may be reset so that the sensors are all reset to a common clock.

In some examples, the processor of the enclosure may be configured to control the charging current delivered via the charging interface based on information received via the wireless communications interface. For example, the processor may be configured to adjust the charging current delivered to the sensors by controlling the charging interface (for example by controlling the generation of an electromagnetic field in the cavity by the charging interface) based on information received via the wireless communications interface. The information received via the wireless communications interface may comprise, for example, the number of sensors inside the cavity.

In some examples the enclosure may be configured to download data from the sensors based on the delivery of a charging current to the sensors via the charging interface. For example, in some examples the sensor battery may be depleted. The enclosure may be configured to deliver a charging current to the sensor to activate the sensor, and in response the sensor may send data to the enclosure. In this way the enclosure may be configured to use the charging interface to trigger the downloading of data from at least one sensor contained within the cavity.

The processor may be configured to download data from the sensors by instructing the sensors over the wireless communications interface to send data to the enclosure.

In some examples, each sensor comprises a local clock so it can time stamp collected data. The processor of the enclosure may be configured to reset the local clock in a/each sensor in response to data being downloaded from that sensor, for example so that the local clock of each sensor inside the enclosure is synchronised to the same time.

The processor may be configured to communicate with a remote system over a telecommunications network and pair the sensors to an account on the remote system. The enclosure may further comprise a second wireless communications interface for connecting to the telecommunications network. In some examples, the wireless communications interface comprises a Bluetooth® interface and the second wireless communications interface is configured to connect to a WiFi® network.

However, in other examples the enclosure may comprise only one wireless communications interface. For example, the single wireless communications interface may be configured to communicate with both the sensors and a mobile device, for example via a Bluetooth® connection. For example, the single wireless communications interface may be a Bluetooth® interface, for example Bluetooth® version 4.2 or above, and may receive data from the sensors in the item of smart clothing via the single wireless communications interface. The processor 110 may be operable to receive data from the sensors 500 and upload the received data to a remote system via a common or the same wireless communications interface 116. For example, the processor may then be operable to upload the data received from the sensors to a remote system, such as in the cloud, via a wireless connection (such as a Bluetooth® connection) via the single wireless communications interface 116, and the mobile device may in turn be connected to a mobile telecommunications network to access the remote system.

The processor may be configured to obtain a unique identifier for each sensor, and pair the unique identifier of each sensor to an account on the remote system. For example the processor may be configured to identify a mac address for each sensor and pair the mac address of each sensor to an account on the remote system.

The enclosure may further comprise a non-volatile data store coupled to the processor, and the processor may be configured to collate data received from the sensors in the non-volatile data store, and upload the collated data to the remote system. The remote system may be accessible via a wide area network such as the internet, and the processor may be configured to upload data received from the sensors to the remote system in response to the enclosure being both (i) connected to the wide area network and (ii) the power supply being coupled to a source of power.

The processor may be configured to upload data received from the sensors to the remote system in response to the enclosure being connected to the internet via a connection with a mobile device.

At least one of the enclosure and the cavity may be shaped to inhibit leakage of electromagnetic energy such as RF energy. For example, at least a portion of the enclosure may comprise a conductive mesh to inhibit leakage of electromagnetic energy such as RF energy out of the cavity and/or a conductive foil to inhibit leakage of electromagnetic energy such as RF energy out of the cavity. In some examples, at least a portion of the enclosure is manufactured from a laminated conductive foil, which may for example be single or double-sided. The thickness of the conductive foil may range from 1 Angstrom (0.1 nm) up to 0.2 mm or higher. The enclosure may be at least partially rigid, for example the conductive mesh/foil may be rigid.

The charging interface may be at least partially inside the cavity. The wireless communications interface may also be at least partially inside the cavity.

In some examples the enclosure also comprises a power supply interface coupled to the charging interface for powering the transfer of electromagnetic energy such as RF energy from the charging interface to charge the battery-powered sensors. The power supply interface may be configured to receive at least one of:
 (i) a voltage from 2.5V to 50V, for example 12V;
 (ii) a DC power supply; and
 (iii) an AC power supply.

In some examples the enclosure comprises a visual indicator coupled to the processor and configured to display an indication of at least one of (i) whether sensors in the enclosure are being charged or (ii) whether sensors in the enclosure are charged above a selected threshold level of charge.

The enclosure may be configured to hang from at least one of a hook and a clothes rail, optionally wherein the cavity is shaped to contain a hanging item of clothing. In some examples the enclosure is collapsible to reduce the size of the cavity when not in use.

In another aspect of the disclosure there is described a method of charging an item of smart clothing comprising a plurality of battery-powered sensors, the method comprising:
 delivering electromagnetic energy such as radio frequency, RF, energy wirelessly to the plurality of battery-powered sensors contained in a cavity;
 in response to delivering electromagnetic energy wirelessly to the plurality of battery-powered sensors, communicating with the sensors via a wireless communications interface;
 obtaining a unique identifier, such as a mac address, of each sensor via the wireless communications interface;
 communicating with a remote system over a telecommunications network;
 uploading data from each sensor to the remote system over the telecommunications network.

It will be understood that the method may comprise performing housekeeping and downloading data-logged information obtained whilst the sensors were external to the enclosure and in general use.

The method may further comprise:
 determining that the plurality of sensors have a level of charge above a threshold level of charge; and
 in response to determining that the plurality of sensors have a level of charge above a threshold level of charge, instructing the plurality of sensors to enter a sleep mode of operation that consumes less power than a normal mode of operation.

In some examples, in response to obtaining a unique identifier of each sensor via the wireless communications interface, each sensor is instructed to reset a local clock.

An example order of events may be:
1. Garment placed in enclosure;
2. Sensor batteries start to charge;
3. Once the batteries reach a certain percentage full and able to sustain communications, then they broadcast their presence;
4. The enclosure processor receives this and from the message obtains a unique identifier from the sensors, for example its MAC address;
5. By referring to a database, for example in a local cache or on a remote database, for example in the cloud, the identity of the sensor and its associated garment is obtained, along with unique identifiers for sibling sensors;
6. The clocks are all reset to a common time;
7. Any stored data on the sensor is offloaded by the enclosure for onward submission to a remote device such as the cloud.

In another aspect of the disclosure there is described a computer readable non-transitory storage medium comprising a program for a computer configured to cause a processor to perform the method described above.

DRAWINGS

Embodiments of the disclosure will now be described, by way of example only, with reference to the accompanying drawings, in which.

SPECIFIC DESCRIPTION

Figure 1:
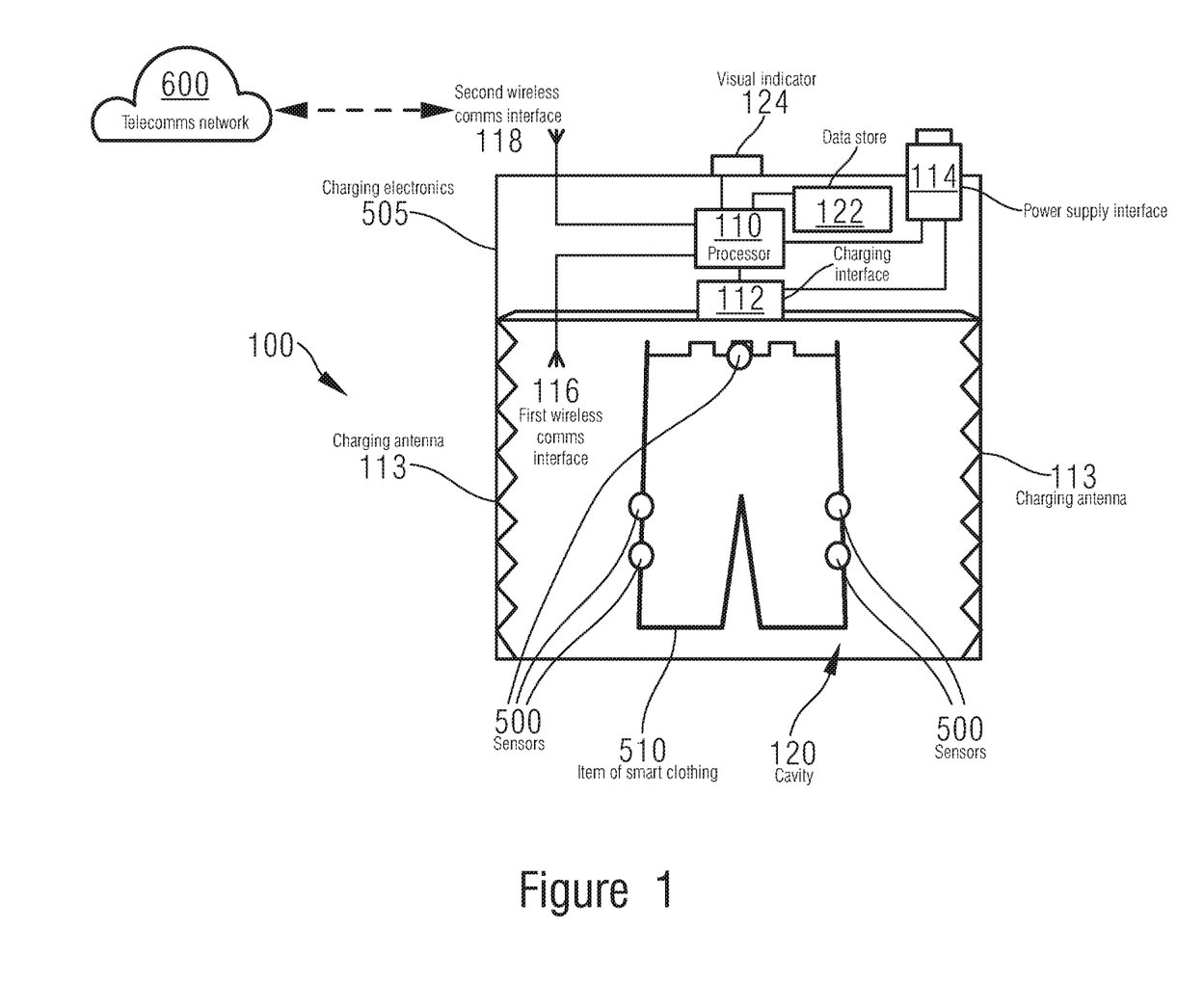
FIG. 1 shows a cross-section of an example enclosure for charging an item of smart clothing.

An example enclosure 100 for charging an item of smart clothing 510 is shown in FIG. 1. The enclosure 100 comprises a cavity 120 shaped to contain a hanging item of smart clothing. In the example shown in FIG. 1, the cavity 120 is large enough to contain a pair of smart trousers hanging inside the enclosure 100, although it will be understood that in other examples the cavity 120 may be larger or smaller as may be appropriate or different items of smart clothing 510. As shown in FIG. 1, the item of smart clothing 510 comprising a plurality of sealed and self-contained battery-powered sensors 500 that are distributed around the item of smart clothing 510.

The enclosure 100 shown in FIG. 1 also comprises charging electronics 505. In the example shown in FIG. 1, the charging electronics 505 form a boundary to the cavity 120 and are located in a top portion of the enclosure 100, although it will be understood that in other examples the charging electronics 505 may be located elsewhere in the enclosure 100, for example the charging electronics may be placed within the cavity 120.

The charging electronics 505 comprises a processor 110 coupled to a charging interface 112 and a first wireless communications interface 116. Also shown in the example of FIG. 1, the processor 110 is also optionally coupled to a power supply interface 114, a non-volatile data store 122, a second wireless communications interface 118, and a visual indicator 124. In the example shown, the power supply interface 114 is also directly coupled to the charging interface 112.

The charging interface 112 may be a Radio Frequency, RF, based wireless charging technology. The charging interface 112 may be configured to deliver RF energy having a frequency between 900 MHz and 20 GHz, for example less than 10 GHz. Preferably the RF energy will have a frequency of 5 GHz. In some cases, the charging interface 112 and/or the processor 110 may be programmed with algorithms to control the charging process. In the example shown, the charging interface 112 is coupled to two charging antennae 113 inside the cavity 112, although it will be understood that there may be fewer or more charging antennae 113, or that the charging antennae 113 may be optional and/or may be provided as part of (for example, integral to) the charging interface 112. In some examples the charging interface 112 may therefore be at least partially inside the cavity 120.

The antennae 113 could take many forms, including and not limited to dipole, whip, helicoil or patch and may also employ Fresnel patch antennas to provide an even field strength throughout the cavity. In some examples (for example as described in FIG. 6 described in more detail below) the antennae 113 may be spaced at intervals along a dimension, such as the length, of the enclosure 100.

In the example shown, the first wireless communications interface 116 is at least partially inside the cavity 120. In the example shown, the second wireless communications interface 118 is outside the cavity 120, and also outside the charging electronics 505 and the enclosure 100.

In the example shown, at least a portion of the enclosure 100 bounding the cavity 120 comprises a conductive foil to inhibit leakage of radio frequency, RF, energy out of the cavity 120, and may, for example, be manufactured from a conductive medium such as a laminated conductive foil, metal mesh or sheet or other such conductive materials including graphene. The conductive medium may provide a ground plane for the antennae 113. In other examples, however, the enclosure 100, or at least a portion of the enclosure 100, may comprise other means to inhibit leakage of RF energy out of the cavity 120, such as a conductive mesh.

The cavity 120 is configured to receive an item of smart clothing 510. The charging interface 112 is configured to wirelessly deliver RF energy into the cavity 120 to charge the plurality of battery-powered sensors 500. The charging interface 112 may be configured to deliver from 1 mA to 1 A of energy, for example at least 15 mA of energy to the battery in each sensor 500 in the cavity 120.

The first wireless communications interface 116 is configured to transmit and receive data to and from the plurality of sensors 500, for example via the Bluetooth® protocol such as Bluetooth® 4.2 or above. The first wireless communications interface 116 is configured to support a plurality of simultaneous connections such that it can communicate with all of the plurality of sensors 500. The processor 110 is configured to control operation of the charging interface 112 and the first wireless communications interface 116, and to process data received from the sensors 500 via the first wireless communications interface 116.

At least one of the enclosure 100 and the cavity 120 is shaped to inhibit leakage of RF energy, for example at least one of the enclosure 100 and the cavity 120 may be configured to provide a Faraday cage.

The power supply interface 114 is configured to provide power to the charging interface 112 to power the transfer of RF energy from the charging interface 112 to charge the battery-powered sensors 500. The power supply interface 112 is configured to receive at least one of:
  (i) a 2-50V power supply, such as a 12V power supply (for example, from a car cigarette lighter socket);
  (ii) a DC power supply; and
  (iii) an AC power supply having a voltage selected from one of: 110V, 220V and 230V (for example from a conventional wall outlet power socket).

The second wireless communications interface 118 is configured to connect to a telecommunications network 600, such as a WIFI® network and/or a mobile telecommunications network. In some examples the second wireless communications interface 118 is capable of directly connecting with another wireless device without the need for an intermediary wireless access point, for example the second wireless communications interface is capable of WiFi® Direct.

The processor 110 is configured to determine if the sensors 500 are being charged by the charging interface 112, and in response to the processor 110 determining that the sensors 500 are being charged, the processor 110 is configured to control the first wireless communications interface 116 to download data from the sensors 500. The processor 110 may be configured to download data from the sensors 500 by instructing the sensors 500 over the first wireless communications interface 116 to send data. For example, the processor 110 may be configured to send a signal via the first wireless communications interface 116 to the sensors 500 instructing them to upload data to the charging electronics 505. The charging electronics 505 may receive the uploaded sensor data via the first wireless communications interface 116, and store it in the data store 122.

In the example shown in FIG. 1, the antennae 113 are arranged to be parallel and to extend longitudinally along opposing walls of the cavity 120, although it will be understood that the antennae 113 may adopt other configurations in other examples. In the example shown in FIG. 1, the antennae 113 are configured to extend either side of the item of smart clothing 510 and oppose each other such that the sensors 500 of the item of smart clothing 510 are sandwiched between two opposing antennae 113.

The antennae 113 of the enclosure may be to matched to the antennae in the sensors. Preferably the orientation of the antennae 113 and the antennae in the sensors will not matter. The charging interface 112 may employ scattering techniques to address this such as bouncing them off a rotating metallic fan or similar structure.

In some examples, the processor 110 is configured to communicate with a remote system and pair the sensors 500 to an account on the remote system. The remote system may be, for example, in the cloud, and accessible via the second wireless communications interface 118 over a wide area network such as the Internet, for example via the telecommunications network 600 and/or a WiFi® network.

In the example shown in FIG. 1, where the processor 110 is coupled to a non-volatile data store 122, the processor 110 is configured to collate data received from the sensors 500 in the non-volatile data store 122, and at a selected time, upload the collated data to a remote system. In some examples the processor 110 is configured to upload data received from the sensors 500 to a remote system in response to the enclosure 100 being connected to the internet, for example via a connection with a mobile device or with a WiFi® network over the second wireless communications interface 118. In some examples, the processor 110 may be configured to upload data received from the sensors 500 to a remote system only when the second wireless communications interface is connected to a WiFi® network. In this way, data may be uploaded to the remote system only when there is sufficient bandwidth available to do so. In some examples, the processor 110 may be configured to upload data received from the sensors 500 to the remote system in response to the enclosure 100 being both (i) connected to the internet (for example, via the second wireless communications interface 118) and (ii) the power supply interface 114 being coupled to a source of power.

In some examples, the processor 110 is configured to obtain a unique identifier from each sensor 500 and attribute each unique identifier to a user account, for example a user account held on the remote system. For example, the processor 110 may be configured to identify a mac address for each sensor 500 and pair the mac address of each sensor 500 to an account on the remote system. This may be achieved, for example, by referencing the unique identifier in a database, such as in a local cache or in a remote database, for example held on a remote device such as in the cloud.

As noted above, in the example shown in FIG. 1, the charging electronics 505 also comprises a visual indicator 124 coupled to the processor 110 and configured to display an indication of at least one of (i) whether sensors 500 in the enclosure 100 are being charged, and (ii) whether sensors 500 in the enclosure 100 are charged (for example, whether the sensors have a level of charge above a threshold level of charge). The visual indicator 124 may additionally or alternatively display information indicative of whether the power supply interface 114 is coupled to a power source and/or whether at least one of the first wireless communications interface 116 and/or the second wireless communications interface 118 are operational and/or connected to respective networks, such as to the sensors 500 via a Bluetooth® network, or a remote device via the telecommunications network 600. In the present case the visual indicator 124 comprises a plurality of LEDs of different colours (for example, red, green and/or blue), although it will be appreciated that in other examples the visual indicator 124 may comprise LEDs of only one colour or even only one LED, or any form of readable display, such as an LCD or LED display, capable of displaying information indicative of the charging status to a user. In some examples there may not be a visual indicator 124, but instead the above information may be provided to a user, for example, through an application on a computing device such as a mobile device that is coupled to the charging electronics 505, for example via the first wireless communications interface 116.

The processor 110 may also be configured to control the management of heat created by the charging process. This may, for example, be achieved by throttling back the energy such as the charge power delivered via the charging interface 112. For example, there may be a sensor in the enclosure 100 that acts as a field strength monitor. The processor 110 may also be configured to determine if the enclosure 100 is empty, and control the delivery of energy via the charging interface 112 based on this determination. The processor 110 may do this by determining the strength of an electromagnetic field in the cavity using the sensor acting as a field strength monitor.

The enclosure 100 is designed so that at the end of a day wearing an item of smart clothing, a user can simply hang their item of clothing up in the enclosure 100 so that data is downloaded from the sensors 500 and the batteries of the sensors 500 are charged overnight.

In use, a user places their item of smart clothing 510 inside the cavity 120 of the enclosure 100. Radio frequency, RF, energy is wirelessly delivered to the plurality of battery-powered sensors 500 in the item of smart clothing 510 contained in the cavity 120. In response to delivering RF energy wirelessly to the plurality of battery-powered sensors 500, the processor 110 communicates with the sensors 500 via the first wireless communications interface 116. The processor 110 obtains a unique identifier, such as a mac address, of each sensor 500 via the first wireless communications interface 116, and communicates with a remote system over the telecommunications network 600, for example via the second communications interface 118. The processor 110 then uploads data obtained from each sensor 500 to the remote system over the telecommunications network 600.

In some examples, in response to obtaining a unique identifier of each sensor 500 via the first wireless communications interface 116, the processor 110 may instruct each sensor 500 to reset a local clock.

In some examples, each sensor comprises a local clock, and the processor 110 of the enclosure 100 is configured to reset the local clock in a sensor 500 in response to data being downloaded from that sensor 500. This may help to ensure that data is accurately recorded at each sensor 500 with the correct timestamp, and that the data from one sensor 500 can be compared accurately with data obtained from other sensors 500.

In some examples the processor 110 may be configured to determine that the battery in each respective sensor 500 has a level of charge above a threshold level of charge; and in response to determining that the each battery or each of the plurality of batteries have a level of charge above a threshold level of charge, the processor 110 may be configured to instruct the plurality of sensors 500 to enter a sleep mode of operation that consumes less power than a normal mode of operation. In some examples, the processor 110 may additionally or alternatively be configured to turn the sensors 500 off, for example for a selected time period, once the batteries in each sensor 500 have a level of charge above a threshold level of charge. For example, the processor 110 may be configured to turn the sensors 500 off until a selected time, for example, the start of the working day such as 8 am.

A level of charge may be determined based on a voltage of the battery in each sensor 500 or, for example, by coulomb counting the current supplied to each battery or the plurality of batteries via the charging interface 112. A threshold level of charge may be a selected percentage of a maximum obtainable by the battery of each sensor 500, for example 90% of the maximum voltage obtainable by the battery 500. The processor 110 may be configured to obtain the level of charge information either directly by determining the power and/or energy delivered to the batteries of each sensor 500 via the charging interface 112, or may be obtained by polling each of the sensors 500 for an indication of the battery charge. For example, the processor 110 may be configured to send a signal via the first wireless communications interface 116 to each of the sensors 500 requesting status information from each sensor 500, and in response each sensor 500 may send a data signal to the charging electronics 505 via the first wireless communications interface comprising information representative of the state of charge of each battery in each sensor 500.

In some examples the enclosure 100 may comprise only one wireless communications interface 116. The single wireless communications interface 116 may be inside the cavity 120, or may be external to the cavity 120. In some examples the single wireless communications interface 116 may be integral to the charging electronics 505 such that it is inside the charging electronics 505. The single wireless communications interface 116 may be configured to communicate with both the sensors 500 and a mobile device, for example via a Bluetooth® connection. For example, the single wireless communications interface 116 may be a Bluetooth® interface, for example Bluetooth® version 4.2 or above, and may receive data from the sensors 500 in the item of smart clothing 510 via the single wireless communications interface 116.

The processor 110 may be operable to receive data from the sensors 500 and upload the received data to a remote system via a common or the same wireless communications interface 116. For example, the processor 110 may be operable to receive data from the sensors 500, and later upload the data received from the sensors 500 to a remote system, such as in the cloud. The processor 110 may do this via a wireless connection (such as a Bluetooth® connection) with a mobile device through the single wireless communications interface 116, and the mobile device may in turn be connected to a telecommunications network 600 to access the remote system.

In some examples, the processor 110 may be configured to update the firmware running on each sensor 500. For example, the processor 110 may be configured to perform an update check, for example, with the remote system over the telecommunications network 600 via the second wireless communications interface 118, to periodically check and determine if the sensors 500 are running the latest available version of firmware. If the sensors 500 are determined to not be running the latest version of firmware, the processor 110 may be configured to download the latest version of firmware from the remote system, for example via the second wireless communications interface 118, store it in the data store 122, and in turn upload this to each of the sensors 500, for example when they are being charged by the charging interface 112.

Figure 2:
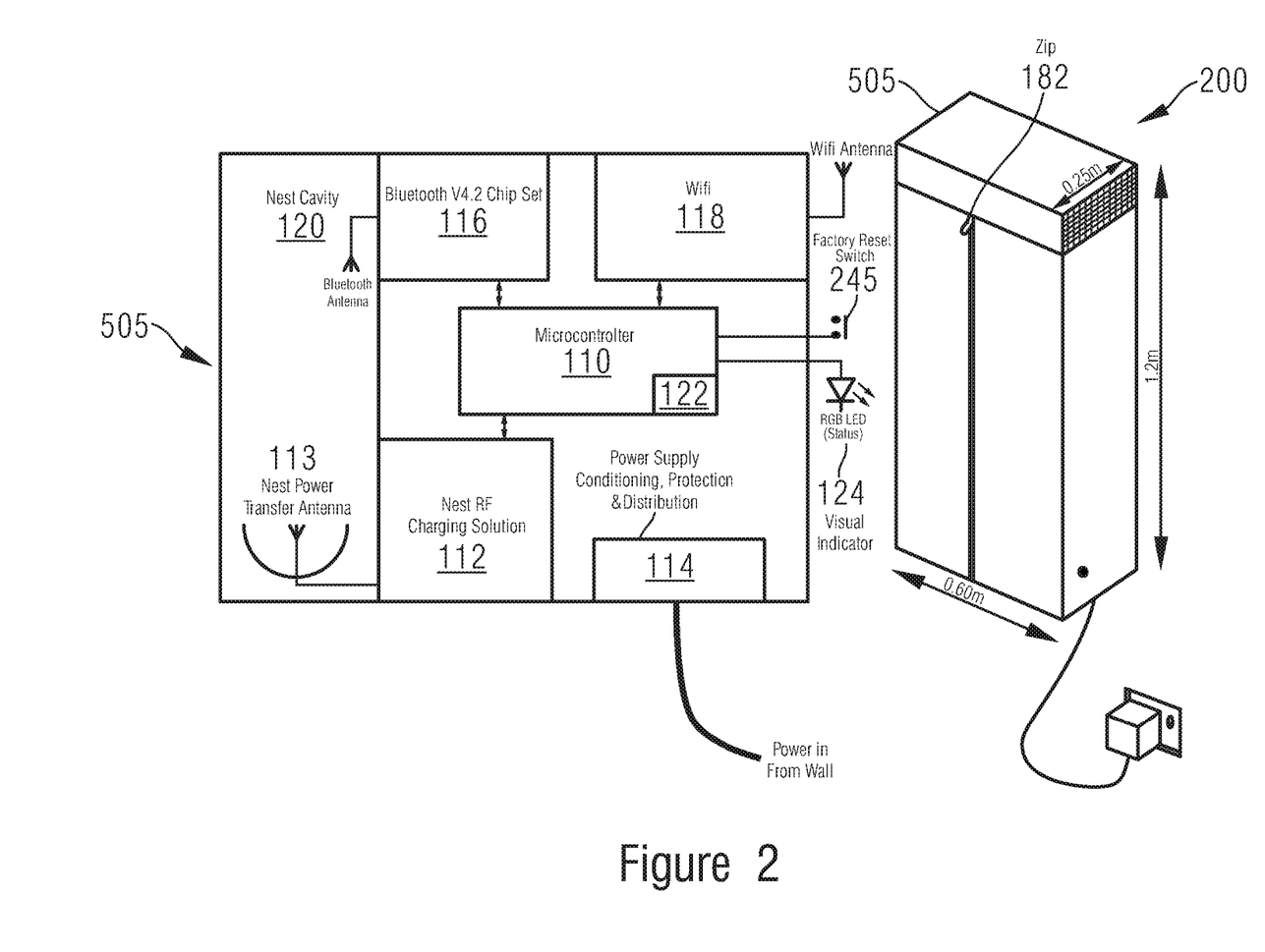
FIG. 2 shows a perspective view of an example enclosure for charging an item of smart clothing and an exploded view of a portion of the enclosure.

FIG. 2 shows another example enclosure 200 for charging an item of smart clothing. The enclosure 200 is in many respects similar to the enclosure 100 shown in FIG. 1 and described above. In the example shown in FIG. 2, the charging electronics 505 of the enclosure 200 also comprises a factory reset switch 245. The factory reset switch 245 may be configured to remove all user recorded data. For example, user recorded data may comprise information for coupling the enclosure 100 to a wireless telecommunications network, such as a WiFi® network, The factory reset switch 245 may delete this data so that the enclosure 100 can be coupled to a different network.

In the example shown in FIG. 2, the power supply interface 114 of the enclosure is coupled to a wall power socket. The exterior dimensions are 1.2 m tall, 0.60 m wide and 0.25 m deep, although of course it will be understood that these dimensions are mere examples and other similar dimensions may be suitable to house and enclose an item of smart clothing 510. In the example shown in FIG. 2, the charging electronics 505 are provided in the top portion of the enclosure 200, such that an item of smart clothing 510 may be suspended in the cavity 120 of the enclosure 200 beneath the charging electronics 505, however it will be understood that the charging electronics 510 may be placed elsewhere within the enclosure 200. Extending from immediately beneath the charging electronics 505 to the bottom of the enclosure, and along a dimension of the cavity (in this case the height) is an opening mechanism 182, which in this example is a zip, for providing access to the cavity 120 and for placing/removing an item of smart clothing 510 from therein.

Figures 3A, 3B:
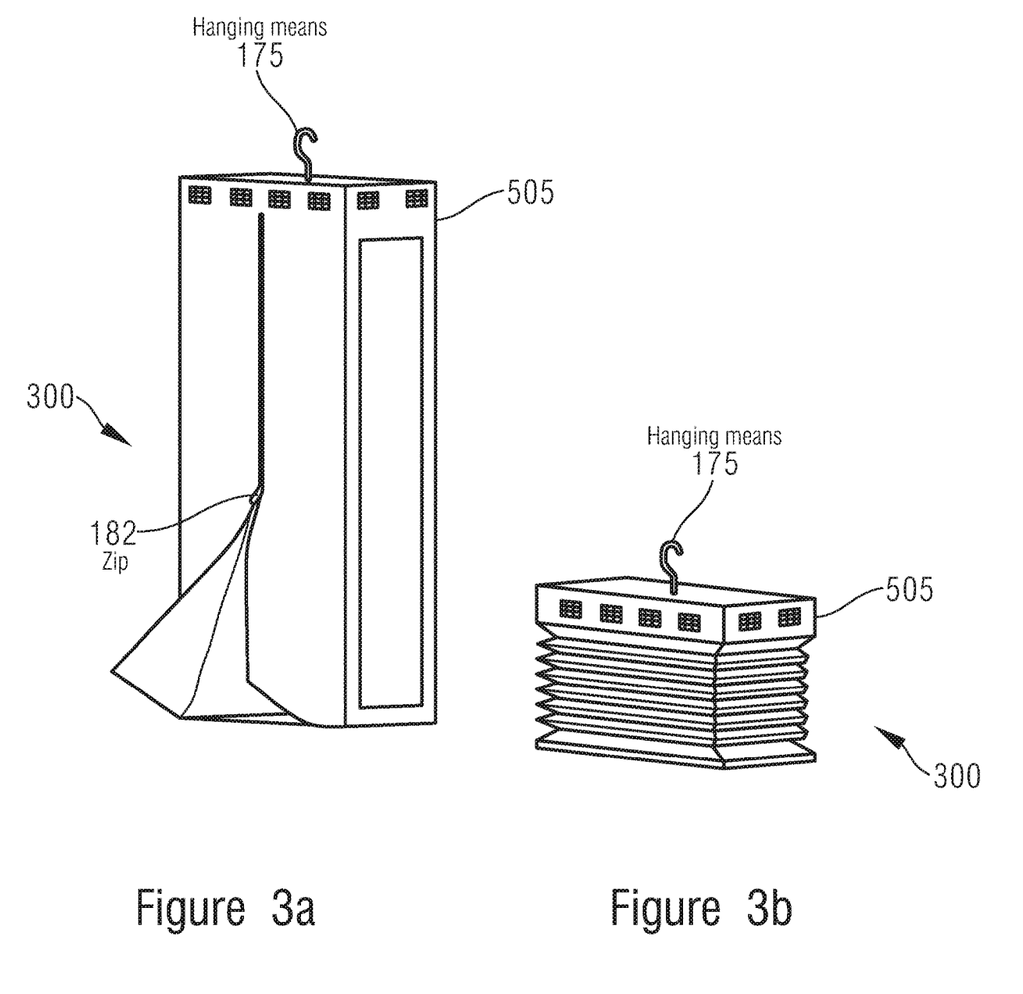
FIG. 3 shows a perspective view of an example enclosure for charging an item of smart clothing in two different configurations.

FIGS. 3a and 3b show another example enclosure 300 for charging an item of smart clothing 510. The enclosure 300 is configured to hang from at least one of a hook and a clothes rail. In the example shown in FIGS. 3a and 3b, the enclosure 300 comprises a hanging means 175 for hanging the enclosure 300 from at least one of a hook and a clothes rail. In the example shown in FIGS. 3a and 3b, the enclosure 300 is fabricated from a laminated conductive foil to inhibit leakage of electromagnetic energy such as RF energy out of the cavity 120 of the enclosure 300. As with the example shown in FIG. 2, the enclosure 300 of FIGS. 3a and 3b comprises an opening mechanism 182, which in this example is a zip, for providing access to the cavity 120 and for placing/removing an item of smart clothing 510 from therein.

In the example shown in FIGS. 3a and 3b, the foil laminate is a laminate of thin aluminium foil bonded onto a fibre such as glass fibre or cotton mesh for structural support. The metal gives the RF functionality, the fibre gives the mechanical support. The foil and fibre mix gives the structure flexibility and is light weight. The foil can be very thin but as it becomes thin it becomes fragile, and so the structure is laminated to provide sufficient strength and support.

As shown in FIG. 3b, the enclosure 300 is collapsible, for example the cavity 120 is collapsible, to reduce the size of the cavity 120 when not in use, for example so that it can be stored easily, for example in a user's vehicle. In the example shown in FIG. 3b, the enclosure 300 is collapsible in a concertina fashion such that in a collapsed configuration the enclosure 300 takes up little more space than the size of the charging electronics 505.

Figure 4:
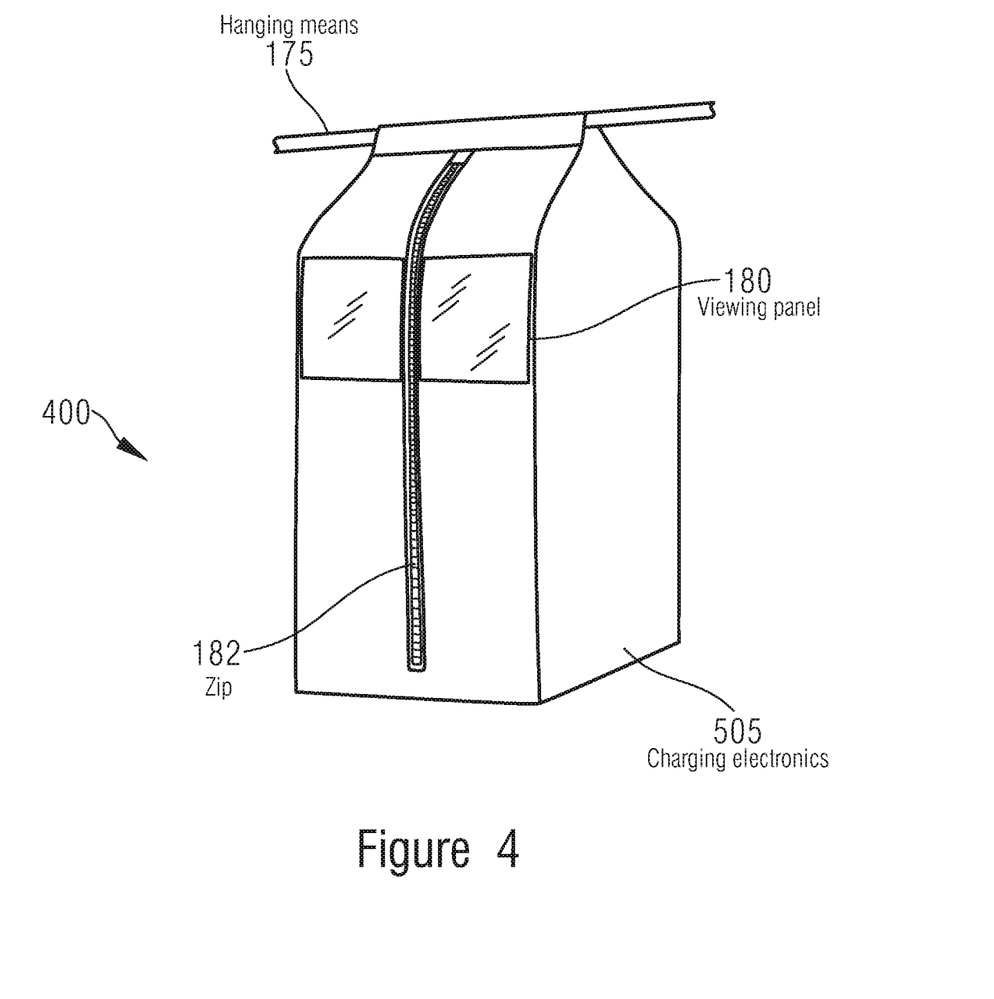
FIG. 4 shows a perspective view of another example enclosure for charging an item of smart clothing.

FIG. 4 shows another example enclosure 400 for charging an item of smart clothing. As with the example shown in FIGS. 2. 3a and 3b, the enclosure 400 of FIG. 4 comprises an opening mechanism 182, which in this example is a zip, for providing access to the cavity 120 and for placing/removing an item of smart clothing 510 from therein. The enclosure 400 also comprises a viewing panel 180 so that a user can view any garments such as the item of smart clothing 510 inside the cavity 120 of the enclosure 120. In the example shown in FIG. 4, the charging electronics 505 in this case are at the bottom of the enclosure 400, such that the cavity 120 is positioned above the charging electronics 505.

Figure 5:
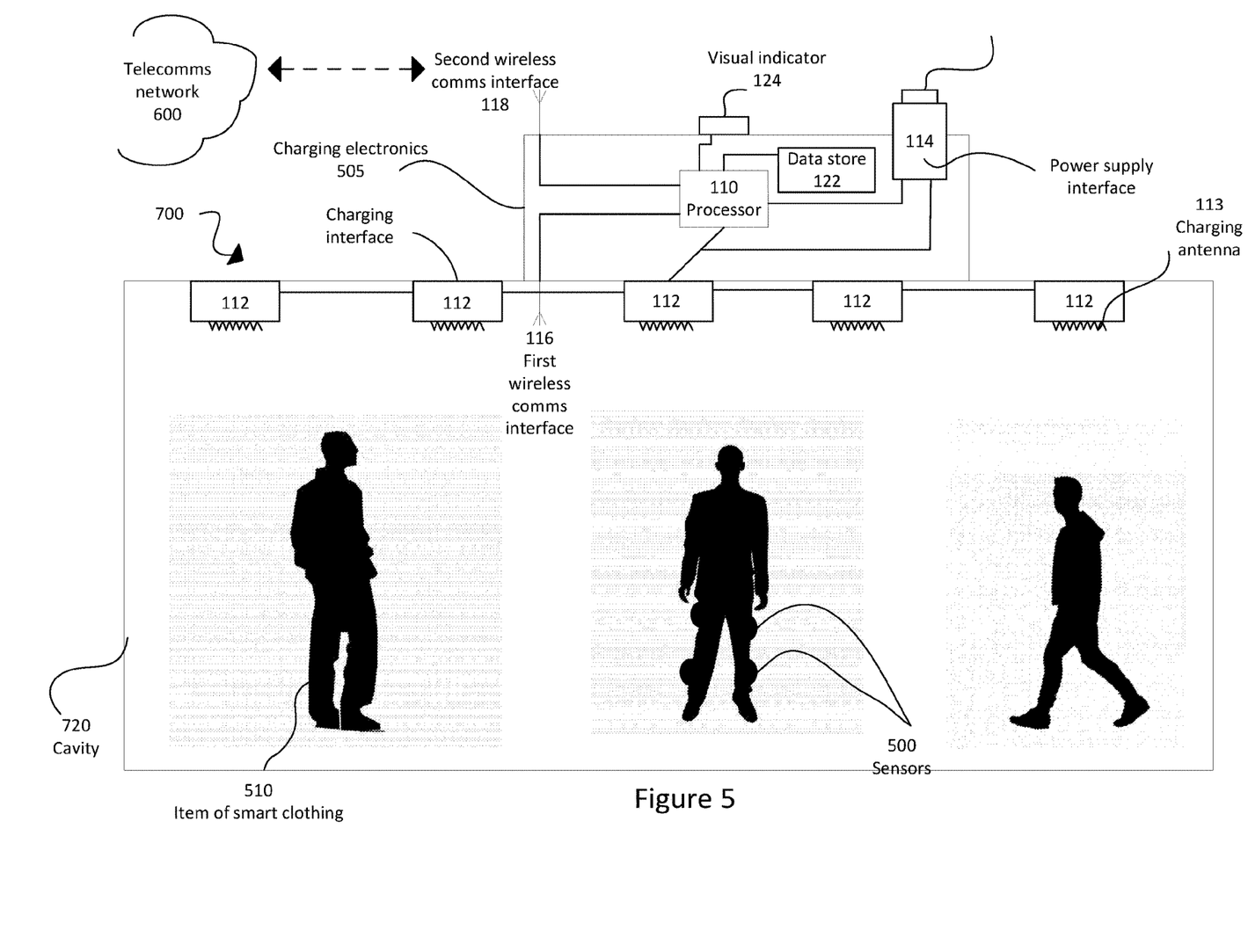
FIG. 5 shows a cross-section of another example enclosure for charging an item of smart clothing.

FIG. 5 shows another example enclosure 700 suitable for charging an item of smart clothing 510. The enclosure 700 of FIG. 5 shares charging electronics 505 in common with the example enclosure 100 described above with reference to FIGS. 1 to 4. The size of the enclosure 700, and of the corresponding cavity 720, however, are much larger. In the example shown in FIG. 5 the enclosure 700 and corresponding cavity 720 are shaped to accommodate a human user wearing an item of smart clothing 510 and is a portable office building such as a Portakabin®. However, it will be understood that the enclosure 700 may be any portable structure or building, for example a portable canteen, portable toilet facilities such as a Portaloo®, or any other similar portable structure.

However it will also be understood that in some examples the enclosure 700 may be integrated into a fixed or permanent structure such as a building or any other pre-defined bonded area—for example the cavity 720 of the enclosure 700 may be formed from the corridor of a building and the walls of the corridor of the building may form the enclosure 700. In such examples, the charging electronics 505 may be integrated into a wall of the building.

In the example shown in FIG. 5, the charging electronics 505 are integrated into a wall of the portable structure. The walls, doors and/or windows of the portable structure may also comprise means to inhibit leakage of radio frequency, RF, energy out of the cavity 720, for example a laminated foil or mesh. In some examples, the cavity 720 may be fully bounded by such means, but in other examples it will be understood that not all surfaces of the structure may comprise means to inhibit leakage of RF energy out of the cavity 720, for example so that a user can freely walk into and out of the cavity 720 through an unbounded area.

In such examples, to reduce the amount of RF energy that leaks out of the cavity 720 through such unbounded areas, rather than having one charging interface 112 configured to deliver an electromagnetic field to serve the whole cavity 720, the enclosure 700 of FIG. 5 has a plurality of charging interfaces 112 (in this case five charging interfaces 112) that are each configured to deliver an electromagnetic field into the cavity. The number of charging interfaces 112 may be selected based on the size of the enclosure 700 and/or cavity 720. The plurality of charging interfaces 112 are distributed at a selected interval (regular or irregular) along a boundary of the enclosure 700 (in the example shown in FIG. 5 they are distributed along the ceiling of the cavity 720). In the example shown in FIG. 5 each charging interface 112 is coupled to a respective antenna 113, although it will be understood that in some examples the antennae 113 may be integral to each charging interface 112 and/or that each charging interface 112 may be coupled or may comprise more than one antenna 113.

Each respective charging interface 112 of the plurality of charging interfaces 112 is configured to deliver an electromagnetic field into the cavity 720 having less power than if a single charging interface 112 were used to serve the whole cavity 720. For example, if a single charging interface 112 were used to deliver 1 W of electromagnetic energy per unit time into the cavity 720, if instead five charging interfaces 112 are used they may each instead be configured to deliver 0.2 W of electromagnetic energy per unit time.

The processor 110 may be configured to control the power delivered to each charging interface 112 and/or the power level of the electromagnetic energy produced by each charging interface 112. Additionally or alternatively, each charging interface 112 may be configured to control the power delivered to each respective antenna 113 and/or the power level of the electromagnetic energy produced from each antenna 113.

Figure 6:
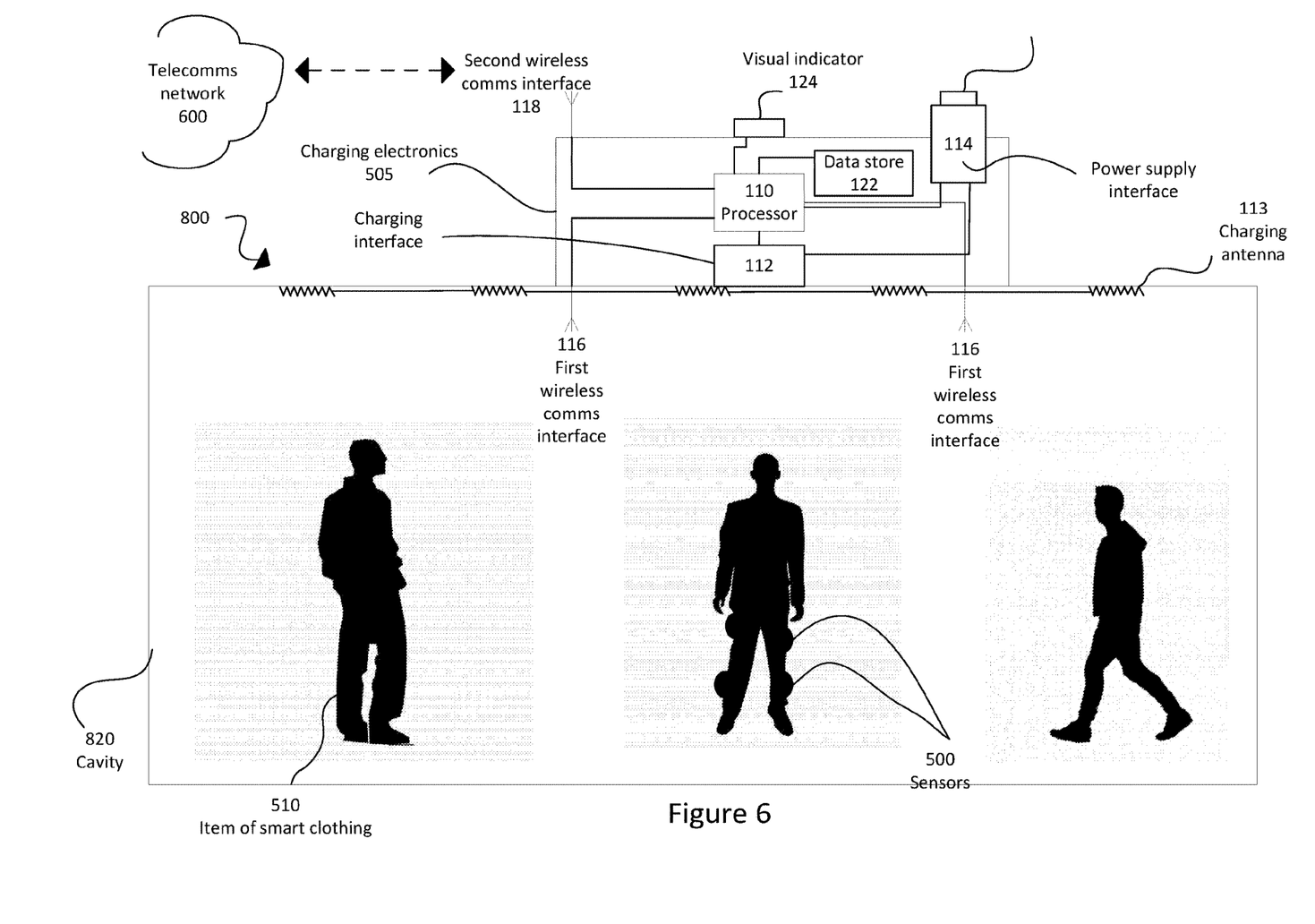
FIG. 6 shows a cross-section of another example enclosure for charging an item of smart clothing.

FIG. 6 shows another example enclosure 800 suitable for charging an item of smart clothing 510. The enclosure 800 of FIG. 6 is very similar to the example enclosure 700 described above with reference to FIG. 5 and shares many common features. However, rather than having a plurality of charging interfaces 112 that are configured to delivery electromagnetic energy into the cavity 820, the example shown in FIG. 6 comprises a single charging interface 112 coupled to a plurality of charging antenna 113.

The charging antennae 113 shown in FIG. 6 are distributed at a selected interval (regular or irregular) along a boundary of the cavity 820. The number of antennae 113 may be selected based on the size of the enclosure 800 and/or cavity 820. Each respective antenna 113 of the plurality of antennae 113 is configured to deliver an electromagnetic field into the cavity 820 having less power than if a single antenna 113 were used to serve the whole cavity 820. For example, if a single antenna 113 were used to deliver 1 W of electromagnetic energy per unit time into the cavity 820, if instead five antennae 113 are used they may each instead be configured to deliver 0.2 W of electromagnetic energy per unit time.

The charging interface 112 and/or the processor 110 may be configured to control the power delivered to each antenna 113 and/or the power level of the electromagnetic energy produced from each antenna 113.

In some examples the enclosure 800 may comprise more than one first wireless communications interface 116. For example, in the example shown in FIG. 6, the enclosure comprises two first wireless communications interfaces 116, both coupled to the processor 110. More than one first wireless communications interface 116 may be used in situations where, such as in the example of FIG. 6, the enclosure 800 and corresponding cavity 820 are particularly large, for example large enough to enclose a user wearing an item of smart clothing 510.

In the context of the present disclosure other examples and variations of the apparatus and methods described herein will be apparent to a person of skill in the art.

The invention claimed is:

1. An enclosure for charging an item of smart clothing comprising a plurality of battery-powered sensors, the enclosure comprising:
    a cavity for receiving the item of smart clothing;
    a charging interface configured to deliver an electromagnetic field into the cavity to charge the plurality of battery-powered sensors;
    a wireless communications interface for transmitting and receiving data to and from the plurality of sensors; and
    a processor configured to control operation of the charging interface and the communications interface;
    wherein the processor is configured to determine if the sensors are being charged by the charging interface, and in response to the processor determining that the sensors are being charged, the processor is configured to control at least one of the sensors and the wireless communications interface to download data from the sensors.

2. The enclosure of claim 1 wherein the processor is configured to download data from the sensors by instructing the sensors over the wireless communications interface to send data to the enclosure.

3. The enclosure of claim 1 wherein each sensor comprises a local clock, and wherein the processor of the enclosure is configured to reset the local clock in a sensor in response to data being downloaded from that sensor.

4. The enclosure of claim 1 wherein the processor is configured to communicate with a remote system over a telecommunications network and pair the sensors to an account on the remote system.

5. The enclosure of claim 4 wherein the enclosure further comprises a second wireless communications interface for connecting to the telecommunications network.

6. The enclosure of claim 4 wherein the processor is configured to identify a mac address for each sensor and pair the mac address of each sensor to an account on the remote system.

7. The enclosure of claim 4 wherein the enclosure further comprises a non-volatile data store coupled to the processor, and wherein the processor is configured to collate data received from the sensors in the non-volatile data store, and upload the collated data to the remote system.

8. The enclosure of claim 1 further comprising a power supply interface coupled to the charging interface for powering the transfer of electromagnetic energy such as RF from the charging interface to charge the battery-powered sensors;
    wherein the processor is configured to communicate with a remote system over a telecommunications network and pair the sensors to an account on the remote system, and
    wherein the remote system is accessible via a wide area network such as the internet, and wherein the processor is configured to upload data received from the sensors to the remote system in response to the enclosure being both (i) connected to the wide area network and (ii) the power supply interface being coupled to a source of power.

9. The enclosure of claim 8 wherein the processor is configured to upload data received from the sensors to the remote system in response to the enclosure being connected to the internet via a connection with a mobile device.

10. The enclosure of claim 1 wherein at least one of the enclosure and the cavity is shaped to inhibit leakage of electromagnetic energy such as RF energy.

11. The enclosure of claim 8 wherein the enclosure comprises at least one of a conductive mesh and a conductive foil to inhibit leakage of electromagnetic energy such as RF energy.

12. The enclosure of claim 9 wherein the enclosure is manufactured from a laminated conductive foil.

13. The enclosure of claim 1 wherein the enclosure is collapsible to reduce the size of the cavity when not in use.

14. The enclosure of claim 1 further comprising a visual indicator coupled to the processor and configured to display an indication of at least one of (i) whether sensors in the enclosure are being charged or (ii) whether sensors in the enclosure are charged above a selected threshold level of charge.

15. The enclosure of claim 1 wherein the enclosure is configured to hang from at least one of a hook and a clothes rail, optionally wherein the cavity is shaped to contain a hanging item of clothing.

16. A method of charging an item of smart clothing comprising a plurality of battery-powered sensors, the method comprising:
    delivering electromagnetic energy wirelessly to the plurality of battery-powered sensors contained in a cavity;
    in response to delivering electromagnetic energy wirelessly to the plurality of battery-powered sensors such that a charging current is created in the sensors, communicating with the sensors via a wireless communications interface;
    obtaining a unique identifier, wherein the unique identifier is such as a mac address of each sensor via the wireless communications interface;
    communicating with a remote system over a telecommunications network; uploading data from each sensor to the remote system over the telecommunications network.

17. The method of claim 16 further comprising:
determining that the plurality of sensors have a level of charge above a threshold level of charge; and
in response to determining that the plurality of sensors have a level of charge above a threshold level of charge, instructing the plurality of sensors to enter a sleep mode of operation that consumes less power than a normal mode of operation.

18. The method of claim 16, further comprising: in response to obtaining a unique identifier of each sensor via the wireless communications interface, instructing each sensor to reset a local clock.

19. A computer readable non-transitory storage medium comprising a program for a computer configured to cause a processor to perform the method of claim 16.

* * * * *